Figure 1:
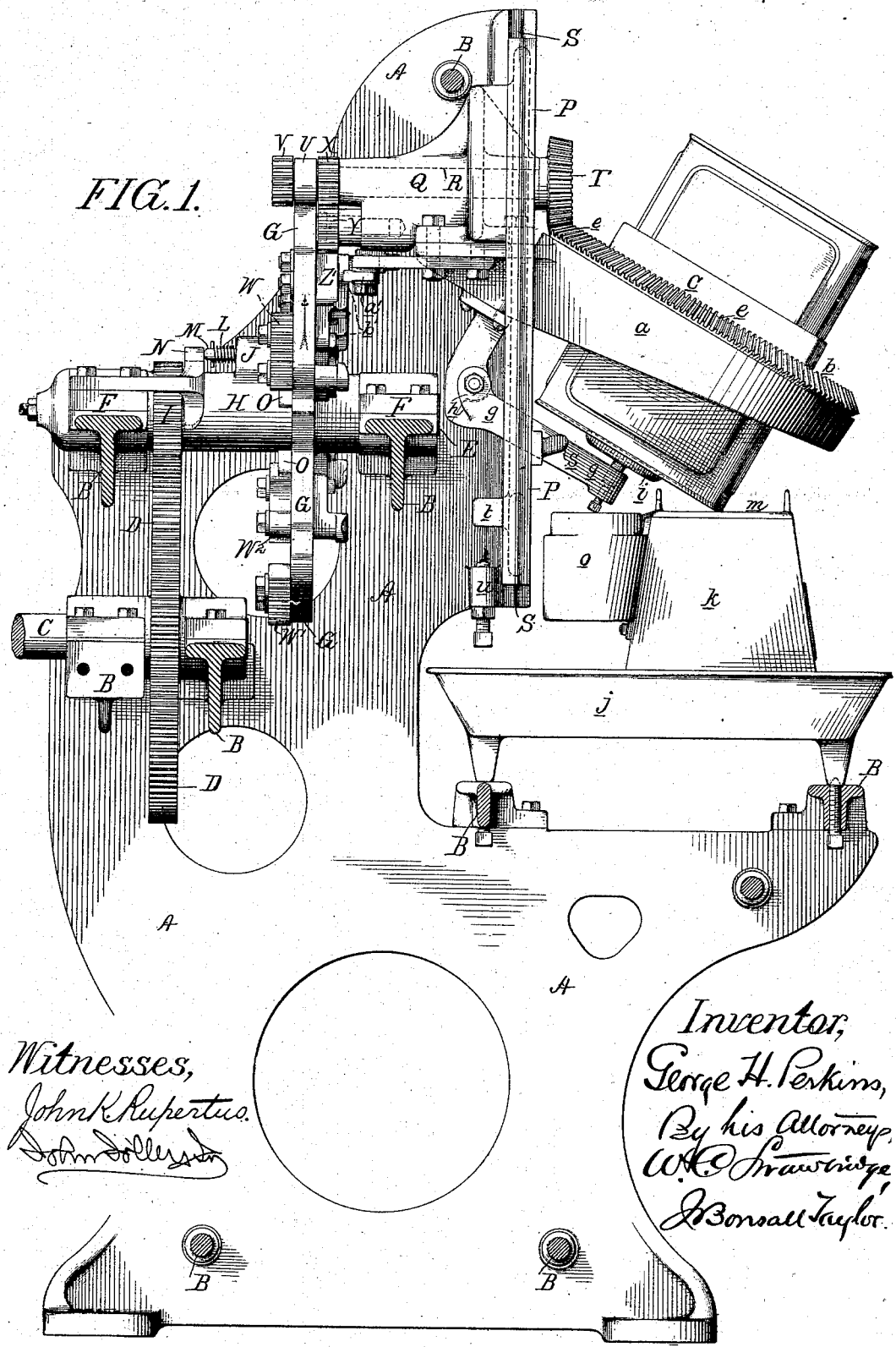

(No Model.)

6 Sheets—Sheet 2.

G. H. PERKINS.
CAN SOLDERING MACHINE.

No. 288,363.  Patented Nov. 13, 1883.

Witnesses,
John K. Rupertus
John Solleyen

Inventor,
G. H. Perkins
By his attys
A. H. Strawbridge
J. Bonsall Taylor (No Model.)  6 Sheets—Sheet 3.
G. H. PERKINS.
CAN SOLDERING MACHINE.
No. 288,363.  Patented Nov. 13, 1883.
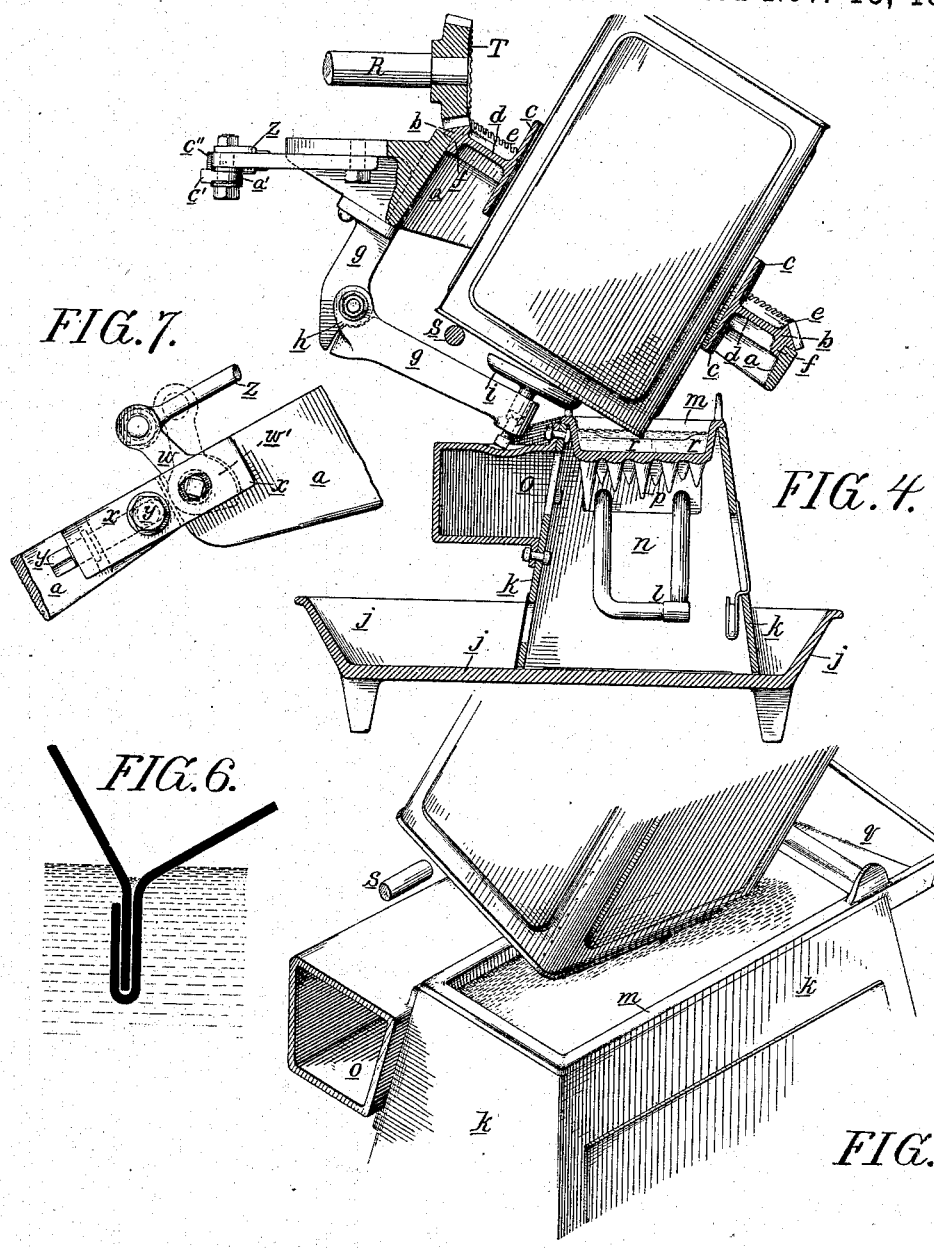
Witnesses,
John K. Rupertus.
Inventor,
George H. Perkins
By his Attorney
W. C. Strawbridge,
Bonsall Taylor,
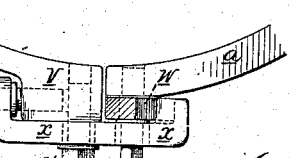
N. PETERS, Photo-Lithographer, Washington, D. C.

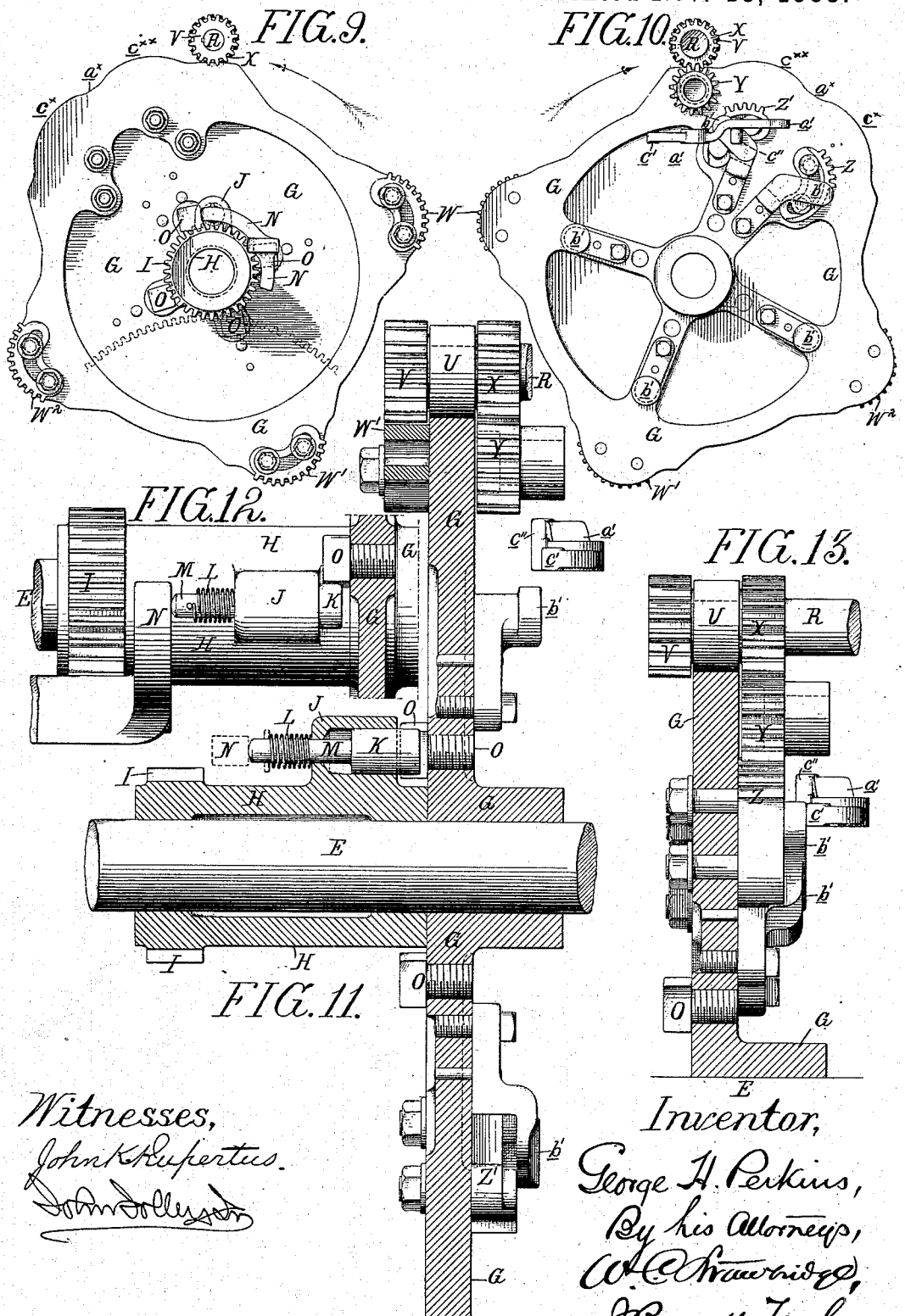

(No Model.)  6 Sheets—Sheet 5.
G. H. PERKINS.
CAN SOLDERING MACHINE.
No. 288,363.  Patented Nov. 13, 1883.
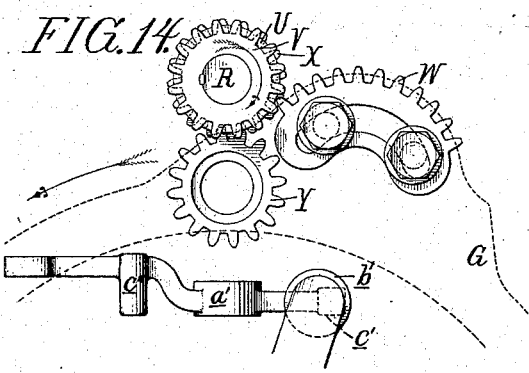
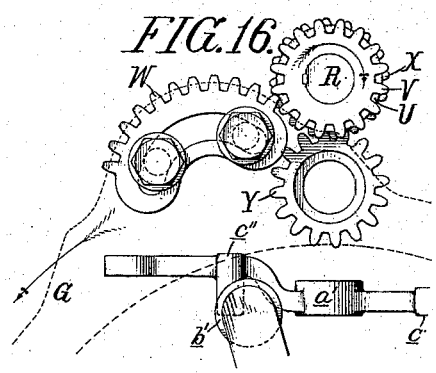
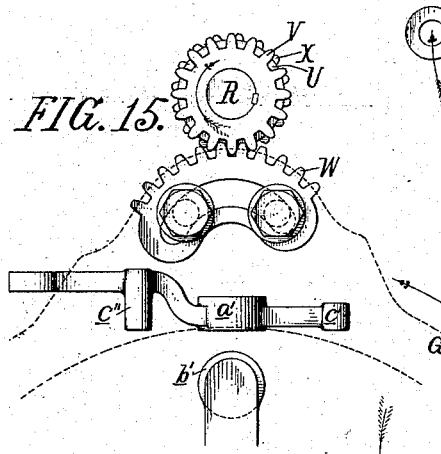
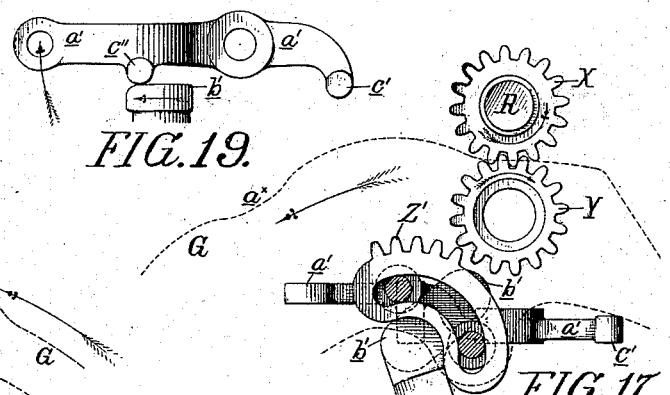
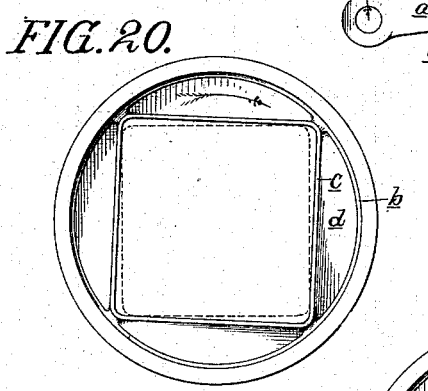
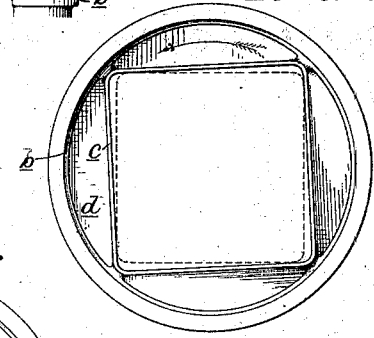
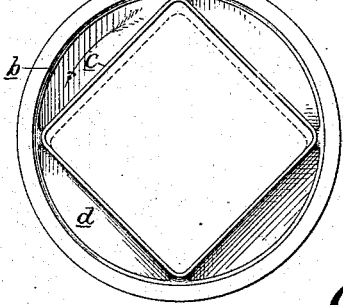
Witnesses,
John K. Rupertus.
Inventor,
George H. Perkins,
By his Attorneys,
C. C. Trowbridge,
J. Bonsall Taylor.

(No Model.) 6 Sheets—Sheet 6.
G. H. PERKINS.
CAN SOLDERING MACHINE.
No. 288,363. Patented Nov. 13, 1883.
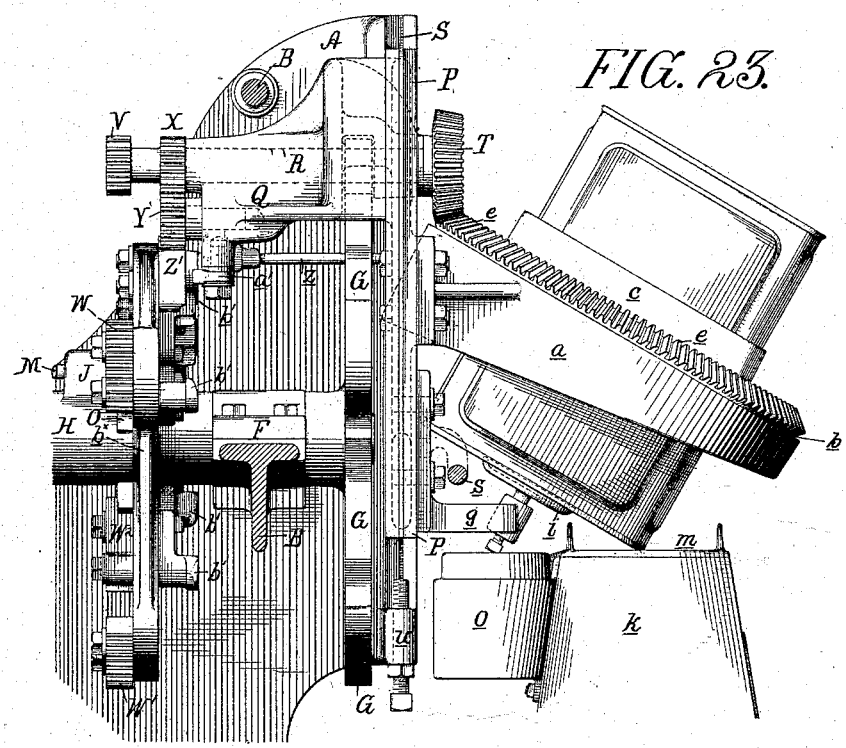
FIG. 23.
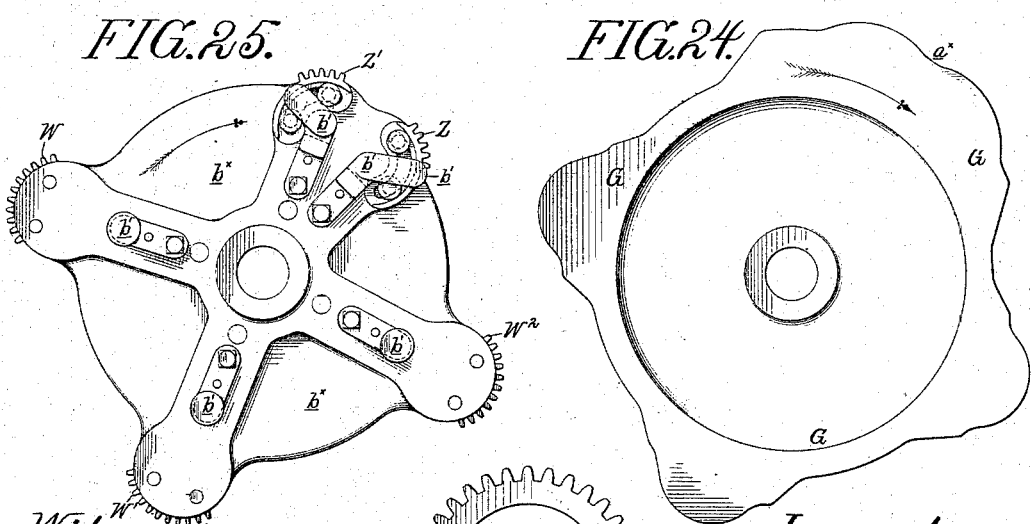
FIG. 25.   FIG. 24.
FIG. 26.
Witnesses,
John K. Rupertus
John Doller
Inventor,
George H. Perkins,
By his Attorneys,
W. C. Strawbridge,
Bonsall Taylor.

United States Patent Office.

GEORGE H. PERKINS, OF PHILADELPHIA, PENNSYLVANIA.

CAN-SOLDERING MACHINE.

SPECIFICATION forming part of Letters Patent No. 288,363, dated November 13, 1883.

Application filed February 1, 1883. (No model.)

*To all whom it may concern:*

Be it known that I, GEORGE H. PERKINS, of the city and county of Philadelphia, in the State of Pennsylvania, have invented certain improvements in methods of and means for automatically soldering the seams which unite the heads, or tops and bottoms, to the bodies of quadrangular, square, hexagonal or other shaped sheet metal cans having angular or approximately angular corners, and being neither circular nor oval in cross section, of which the following is a specification.

After the seams, that is the series of sides which compose them, which are the means of uniting the heads to the bodies of cans of the above description, have been tightly closed by such instrumentalities as may be preferred, and flux has been applied to said seams, the next and last step essential to the completion of the closing and hermetical sealing of the can is the soldering of said seams. In soldering, two objects are to be had in view: first, saving of time, and, second, saving of solder. Heretofore quadrangular, or other angular sheet metal cans have been soldered, either, by hand with a soldering iron, or by a process of hand dipping which makes use, for instance, of such a soldering apparatus as was patented to me August 11, 1874, in and by Letters Patent No. 154,077; or else, by the use of a class of automatic machines of the type invented by Herman Miller of the city of New York, and patented to him May 15, 1877, in and by Letters Patent No. 190,888. The essential instrumentalities or features of construction of the Miller apparatus, and those from which my machine is to be contradistinguished, are, briefly stated,—a central vertical spindle suitably rotated and provided with a series of radially-disposed rigid can holders which tightly grasp the can, which are rotated by the spindle and thereby caused to travel around a series of consecutively arranged troughs designed to contain successively flux, solder, and water; and a sinuous track concentric with and circumscribed by the troughs, the office of which is, first, to raise and lower the can holders with their rigidly contained cans into and out of the successive baths, and, second, to rotate said holders in such manner as successively to expose the same side of the seam of the can to the three given baths, and then rotate the holder and expose a succeeding side of the seam successively to a second series of baths,—the holders being suitably jointed to the radial arms which carry them to permit the rise and fall, and being provided with trip wheels or kindred contrivances to encounter projections upon the track and effectuate the turn described.

Heretofore also cans have been soldered by the employment of an apparatus embodying a stationary track or way, along both sides of which a series of vessels for solder or for acid and solder have been arranged, and in connection with which a series of traveling tilting and rotatable can carriers have been caused to travel along the track and to both tilt so as to occasion the immersion of the seams of first one head and then of the other head of a can secured transversely in them and to rotate so as to expose successively the several sides of said head seams;—all as set forth in United States Letters Patent No. 242,631, granted June 7, 1881, to John Graves for soldering machine. Inseparably characteristic of this class of machinery are its requirement of a large number of separate solder baths,—the tight grip of the holder upon the can essential to insure proper introduction of the can into the baths, but rendering the introduction to and removal of the can from the holder difficult,—and the excess of solder consumed over the amount actually requisite for sealing by reason of the lack of drainage inseparably incident to the position in which the seam is retained and to the congelation of the solder on the seam when immersion in water is resorted to.

Heretofore also cans have been soldered by the employment of an apparatus in which the cans are not inserted in holders but are supported upon a stationary rail or track which extends through or over the vessels containing the flux and solder, and comprises raised portions at the points where the cans are transferred from one vessel to another,—and upon which the cans are so supported that one of the sides of their head seams is immersed to the proper depth, while the can itself is pushed along the track, all as represented and described in United States Letters Patent No. 243,287, granted June 21, 1881, to Herman Miller.

The object of my present invention is to insure complete hermetical sealing with the minimum of solder by the utilization of the principle of immediate drainage of each side of the seam after the removal of such side from the solder bath.

A convenient form of machine adapted to embody my present invention is illustrated in the accompanying drawings. In general terms, the construction of that machine involves a suitable framework containing all the operative parts and preferably supporting both a solder pot or bath and a furnace for retaining in a molten condition the solder in the pot. The operative parts, or those which effect the manipulation of the can and the immersion of its seams after its introduction into the holder of the machine, are, first, a revoluble can-holder larger than the can and conformed to the horizontal sectional outline of the can, into which the can is loosely inserted or dropped; second, a vertically reciprocating or sliding head to which the revoluble can holder is connected and by which it is lifted and dropped so as to lift the can from out of and submerge it in the bath; third, a disk cam, the periphery of which is suitably conformed to lift and drop the sliding head at the proper times, after the proper intervals, and to the required extent; fourth, devices connected with the disk cam which at predetermined intervals occasion predetermined rotations of the can holder during periods when it is elevated by the lift of its sliding head; fifth, means for locking or tightly holding the can holder in the various positions of rotation which it is caused to assume; and, sixth, mechanism for occasioning predetermined movements in the disk cam.

Essential characteristics of the machine above outlined are, that it enables the dipping of the several sides of the head seams of an angular can in rapid successive order; that it further enables the withdrawal in a vertical or approximately vertical direction, as contradistinguished from a lateral direction as in Letters Patent No. 243,287 before referred to, of each side of the seam in turn (after being dipped) from out the solder bath at an angle with respect to the plane of the surface of said bath, so that one end or corner bounding said side of the seam so dipped is lifted from the solder before the other corner of said side,—and the side itself of the seam so dipped, considered as an entirety, is, as stated, taken out from the bath in an angular position, as well represented in Fig. 5, and in such a position that said seam is permitted to drain from the corner first toward the corner last taken out;—that it enables, moreover, the continuous drainage of the side of the seam last dipped, on which the solder is still hot and in consistency to drain, during the time when the side of the seam next in order is being dipped, by placing the seam last dipped in a perpendicular plane;—that it enables, again, the lifting of that side of the head seam which is dipped last from out the solder bath in an angularly opposite position from that in which the side of said seam immediately preceding it stood when said side was lifted, in order that the last side of the seam may drain in an opposite direction from that in which the side immediately preceding it drained, or toward that corner of the head seam of the can which is intermediate between the last and the next to the last side of said seam dipped; that it enables, finally, the subsequent dipping of said intermediate corner so as to insure the drainage of even the last drop from off said corner and seam.

All of the above operations are hereinafter at length detailed, and all of them as hereinafter explained are, in the form of apparatus represented, in a measure due to the fact that the can-holder although of the same outline is somewhat larger than the exterior of the can.

Figure 2:
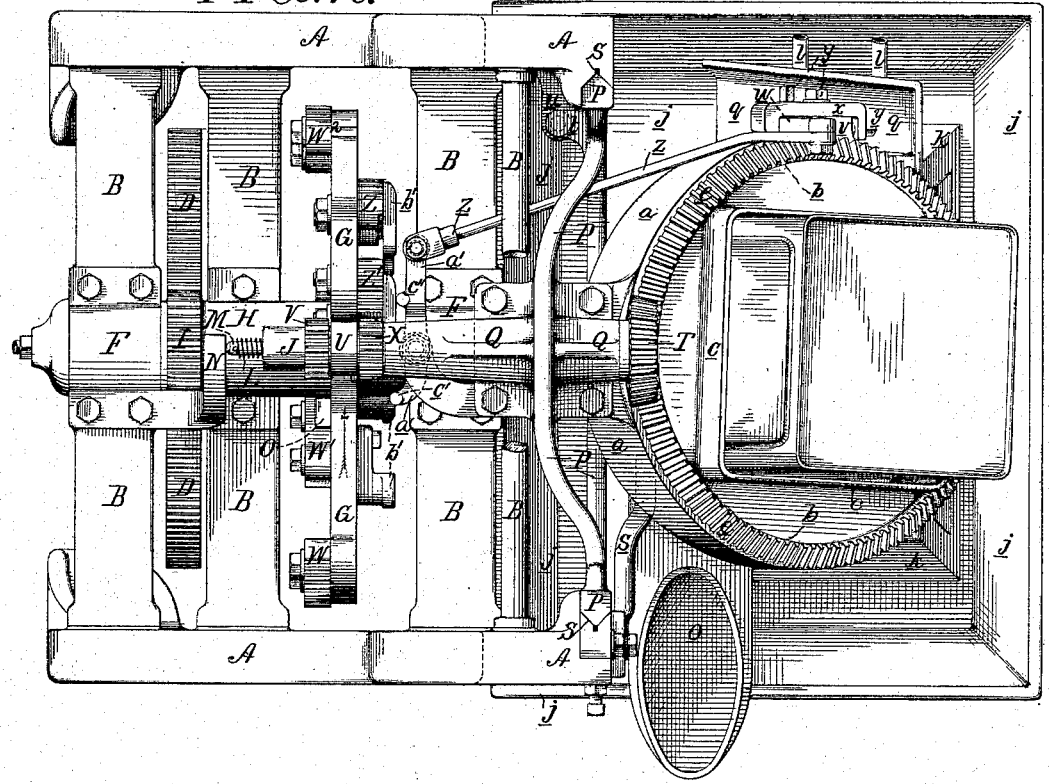
Figure 3:
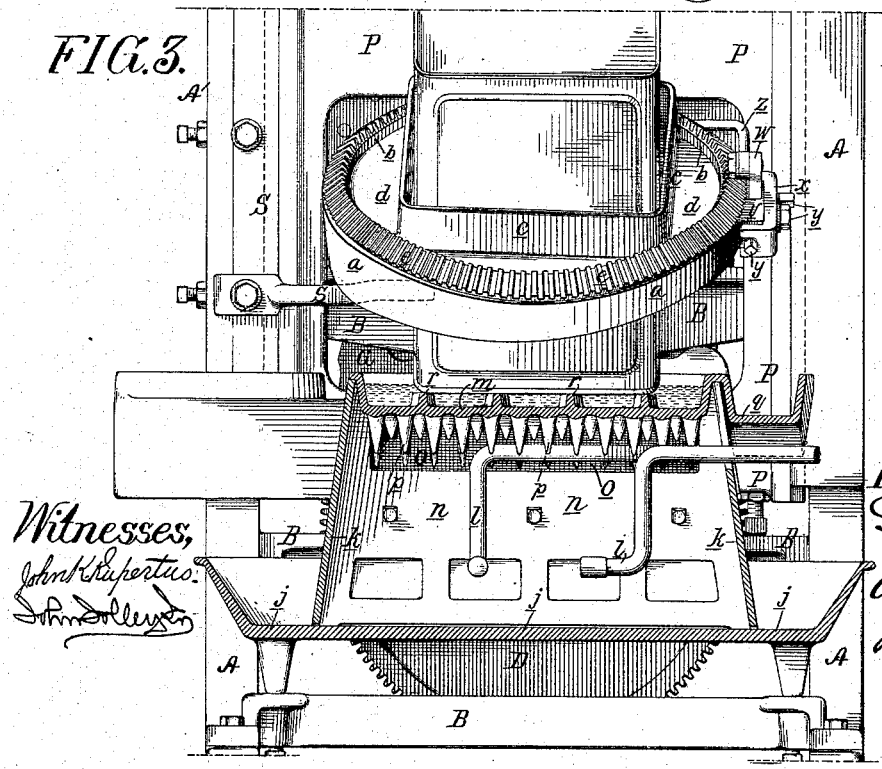

In the accompanying drawings, Figure 1 represents in vertical side elevation a preferred form of an apparatus conveniently embodying my invention, the side frame nearest the eye being removed, the cross ties being in section, and the parts generally being represented in the position which they respectively occupy prior to the moment when the can holder is caused to make its first descent and the can to have its first seam dipped. Fig. 2 is a top plan view of the machine, the parts being in the same position as in Fig. 1. Fig. 3 is a partial front elevational view, the solder pan, tray and casing being in central vertical section and the holder being represented after it has completed its descent. Fig. 4 is a central vertical sectional side elevation of the can holder and holder support, and the solder pan and supporting devices, a can being represented in the holder in the position it occupies when one of its seams is being soldered. Fig. 5 is a perspective view of the solder pan and the bath therein, and of a can represented at the moment of, and in the position which it is caused to assume upon, its removal from the solder, one side of the seam which is being soldered coming out from the bath at an angle. Fig. 6 is a magnified detail illustrative of the vertical immersion of one of the sides of the can seam, the object of such vertical immersion being to avoid too great agitation of the solder in introducing and removing the seam. Fig. 7 is a side elevational detail of that portion of the can holder support which is divided or split, and of the yoke and cam lever which effectuate the tightening up of said support; the cam lever being represented in full lines in the position which it occupies when the parts are tightened up, and in dotted lines in the position which it occupies when the parts are not tightened up. Fig. 8 is a top plan view of the same parts tightened up, the cam lever being represented in section. Fig. 9 is an elevation of the rear face of the disk cam or that face which is furthest from the can holder, showing the plunger sleeve, pinion thereon, and fixed cam way, the disk cam being itself represented in the position which it occupies when the machine is in the position represented in Figs. 1 and 2. Fig. 10 is an elevation of the front face of the disk cam when in the same position as in Fig. 9, showing also the idler pinion, the tappet lever which operates to tighten up the can support, and the tappet cams for operating said lever. Fig. 11 is a vertical central side sectional elevation of the disk cam, plunger sleeve, and plunger socket, representing also the main pinion, the reversing pinion and the idler pinion, and the idler roller which travels upon the periphery of said cam; said disk cam being in the position represented in the detail view of Fig. 15; showing also detached from its connections and in side elevation the tappet lever $a'$ which operates to tighten the can holder support. Fig. 12 is a top plan view of the plunger sleeve and plunger socket and of the fixed cam way which operates the plunger, a portion of the disk cam being shown in horizontal section taken through its web on a plane projected through that plunger pin which in Fig. 11 is shown in encounter with the plunger. Fig. 13 is a vertical central side sectional elevation through the upper portion of the disk cam, taken at the moment when the latter has moved so as to bring the first of its reversing segments (Z) into engagement with the idler pinion, and at the moment when one of the tappet cams $b'$ is in that engagement with the tappet lever, which effects the loosening of the support. Fig. 14 is a skeleton side elevational detail of a portion of the rear face of the disk cam, illustrative of the position of the latter at the moment when one of the main segments (W) is about to engage with the main pinion; the disk cam being represented in dotted lines, and being supposed transparent so as to enable the representation in full lines of the idler pinion and the tappet lever, the knob $c'$ of which latter is in engagement with one of the tappet cams $b'$. Fig. 15 is a similar view of the same parts in the position which they occupy when the segment of Fig. 14 is in central engagement with the main pinion, and when the tappet cam $b'$ has passed out of engagement with knob $c'$ of the tappet lever. Fig. 16 is a similar view of the same parts in the position which they occupy when the segment of Fig. 14 has passed out of engagement with the main pinion, and when the tappet cam $b'$ represented in Figs. 14 and 15 has passed into engagement with the knob $c''$ of the tappet lever. Fig. 17 is a similar view of the disk cam, tappet cam, tappet lever, and the second reversing segment, taken in the position which they occupy when said reversing segment (Z') has passed out of engagement with the idler pinion. Figs. 18 and 19 are top plan details of the tappet lever and one of the tappet cams; in Fig. 18 the tappet cam being in engagement against the knob $c'$ of the tappet lever and the lever being in the position which it occupies when the holder support is loosened in its grip upon the can holder, and in Fig. 19 the tappet cam being in engagement with the knob $c''$ and the tappet lever in the position which it occupies when the holder support is tightened upon the can holder. Figs. 20, 21, and 22, are illustrative diagrams of the can holder viewed from perpendicularly above the plane of its upper surface, the outline of a can being represented in dotted lines in the holder in each figure. In Fig. 20 the holder is represented in the position in which it stops, first, to receive the can, second, after its first quarter turn with the can in it, third, after its second quarter turn with the can in it, and, fourth, after its second one-eighth turn in reversal; this position of the holder is the position of rest whether the holder be up or down, but the position of the can (represented in dotted lines) within the holder is the position which the can assumes when the holder has descended and the can is resting upon the ribs within the solder pan. In Fig. 21 the holder is represented in the position in which it stops after its third quarter turn; it being as will be observed a position angularly opposite to that of Fig. 20, and being the same whether the holder is up or down; the can however is represented in the position which it assumes when the holder is down and when the can is resting upon the ribs in the solder pan. In either of the positions of the holder of Figs. 20 or 21 when the holder is up the can squares itself against the lower side of the holder, and is not angularly disposed with respect to the same as it is in the positions of the holder of Figs. 20 and 21 when the holder is down. In Fig. 22 the holder is represented in the position in which it stops after its first one-eighth turn in reversal whether the holder be up or down, the can being represented in the position it occupies whether the holder be down and dipping or whether the holder be raised and before its further turn. Fig. 23 represents in vertical side elevation a preferred form of a modified construction of an apparatus embodying my invention, the side frame nearest the eye being removed, the cross-ties being in section, and the parts being represented in the position which they respectively occupy prior to the moment when the can holder is caused to make its first descent and the can to have its first seam dipped. Fig. 24 is a front elevation of a modified construction of disk cam employed in the apparatus of Fig. 23, said disk cam being devoid of segments. Fig. 25 is a front elevation of a spider employed to carry both the main and the reversing segmental gears, the tappet cams, and plunger pins, which in the other construction of my apparatus represented in the other figures are all carried by the disk cam. Fig. 26 is an elevational view of a convenient construction of one of the segmental gears, each gear being duplicated so that in the event of breakage of teeth the gear can be reversed and the unbroken portion set into action.

Similar letters of reference indicate corresponding parts.

In the accompanying drawings A are side frames of any preferred construction and outline, but preferably of that outline which is represented in Fig. 1.

B are ties or cross frames which rigidly connect together the side frames and which also serve as supports for the bearings of the various operative instrumentalities.

C (Fig. 1) is the driving or motor shaft, horizontally journaled in the frame work and parallel with the side frames thereof.

D (Figs. 1 and 2) is a driving gear wheel keyed upon the driving shaft and revolved thereby.

E, (Figs. 1, 11 and 12) is a cam shaft, parallel with the driving shaft and journaled in bearings F so as to be disposed vertically above said shaft. The cam shaft extends from bearing to bearing but not externally beyond its bearings, and is equipped with a disk cam G (Figs. 1, 2, 9, 10, 11 13, et al) which revolves either with or upon it as may be desired. It is also equipped with the plunger sleeve H, (Figs. 1, 2, 11, and 12,) which is snugly fitted to rotate thereon.

The plunger sleeve carries a pinion I (Figs. 1, 2, 11, and 12,) either formed as a part of or rigidly connected with it, and in such position as to be always in engagement with the driving gear wheel D. The proportions of the gear wheel and pinion are, for instance, as one to four, the pinion making four revolutions to one of the gear wheel.

Formed upon the exterior of the plunger sleeve is a socket J (Figs. 1, 2, 11, and 12,) containing a spring-controlled plunger K adapted by virtue of a spring L coiled about its rearwardly extending shank or rod M to be kept constantly within the socket except at such times as said plunger rod M encounters a fixed cam way N connected with one of the bearings of the cam shaft or other fixed point of support. This encounter takes place upon every revolution of the plunger sleeve, and the plunger rod is influenced thereby so as to force the plunger forth from its socket and compress the spiral spring. The plunger is held continuously out during such period as its rod is traveling against the cam way N.

Upon the rear face of the disk cam are four fixed stops or plunger pins O, some one of which the plunger encounters during the time that it is held out from its socket as above described. By this encounter the disk cam is given something short of a quarter turn or rotation, the plunger only operating against a given pin so long as its rod is traveling over the cam way, the length of which is predetermined, and the disk cam "dwelling" or remaining stationary during such further period of revolution of the plunger sleeve as takes place while the plunger is within its socket.

The disk cam proper, that is apart from the several devices which it carries, (represented in Figs. 1, 2, 9, 10, 11, 13, and 24) is designed, primarily, to effectuate the lift and drop of the sliding head P, its outline and various curvatures being such as, through the medium of the sliding head and can holder, to occasion both the immersion and the elevation of the can with respect to the solder bath and its retention in such elevated position as enables its being turned above said bath, and to occasion moreover, as hereinafter fully explained, the dipping of the four sides and of one corner of each head seam;—and is designed, secondarily, to carry or be equipped with such devices or instrumentalities as enable the quarter rotation of the can for the dipping of the four sides of the seam in turn, and its partial reverse rotation for the dipping of the corner.

The sliding head P, Figs. 1, 2 and 3, is a rectangular frame of any suitable construction but preferably of that shown in the drawings, from the upper rear face of which is horizontally extended a boss Q which is horizontally drilled to fit it to receive and form a bearing for a pinion shaft R which extends rearwardly beyond the boss and beyond the front face of the sliding head. This frame or sliding head is fitted in vertical ways S formed in the side frames so as to be adapted to move vertically with respect to said frames.

The forward extremity of the pinion shaft is equipped with a beveled pinion T the office of which is to impart rotation to the can holder as hereinafter described. The rear extremity of said shaft is equipped with an idler friction roller U which registers in line above the disk cam and serves as a medium through which the sliding head rests upon the disk cam. The lift of the cam is thus transmitted through the pinion shaft and boss to the sliding head and can holder, the construction of the head and boss being sufficiently substantial to admit of the vertical movement imparted to them without strain or damage.

V is a pinion keyed upon the extreme rear extremity of the pinion shaft beyond the idler roller, which I term the main pinion, its office, through the instrumentality of certain segmental gears upon the disk cam, being to effect the forward quarter turns of the can holder.

W W' W$^2$ are segmental gears, Figs. 1, 2, 9, 11, 14, 15, and 16, affixed to the rear face of the disk cam at three of its "crests," as well represented in Fig. 9. The office of these gears, which I term the main segments, is, by engagement with the main pinion, to revolve the pinion shaft and impart to its beveled pinion such rotation as will be sufficient to occasion the quarter rotation of the can holder: thus in one revolution of the disk cam, three quarter-turns, occasioned by the successive encounter of the three segmental gears described with the main pinion, are imparted to the can holder. During the period of the revolution of the disk cam in which its main segments are not in contact with the main pinion the pinion shaft and can holder are, so far as quarter turns are concerned, at rest.

The application of the main segmental gears to the cam is preferably such as to admit of a slight adjustment of the gears, although the latter are not necessarily made separate from the cam but may be formed as a part thereof.

X is a pinion which I term the reversing pinion, and which is keyed to the pinion shaft between the rear face of the boss and the idler roller. It is in constant engagement with an idler pinion Y journaled in the boss in vertical alignment below said reversing pinion.

Z Z' are reversing segments as I term them, being segmental gears of any fit construction applied to the front face of the disk cam in such position as to be adapted in the rotation of the latter to encounter the idler pinion and, through the instrumentality thereof, revolve the reversing pinion and the pinion shaft in the opposite direction from that of the rotation imparted to them through the main segmental gears and the main pinion. Each of these reversing segments is, approximately, of one half the length of the main segments, and each is adapted to impart to the pinion shaft a movement of but one half the extent of that imparted to it by the main pinion and main segments, or to impart, approximately, an eighth turn to the can holder. These reversing segments are represented in proper position upon the disk cams in Figs. 1, 2, 10, 11, 13, and 17; that position is determined and calculated by the timing of the cam and of the can holder, and, as will be observed by reference to Figs. 9 and 10, is intermediate between that of the main segments, so that the reversing segments do not operate except after the successive operation of the three main segments.

The foregoing description explains the operation of the sliding head in being lifted and dropped and of the pinion shaft in being rotated in a forward direction and then reversed. It may be well just here to recapitulate by stating that the disk cam effects the lift and drop of the sliding head and can holder, and the segmental gears which said disk cam carries, and the pinions and pinion shaft, effect the proper intermittent rotation and reversing of the can holder.

The devices which go to compose the can holder proper are the following:—$a$, Figs. 1, 2, 3, and 4, is the can holder support, being a circular frame, ring, or band, rigidly affixed or secured to the sliding head so as to project downwardly at an inclination from the front face thereof, said inclination being determined by the angle of the seam of the can, that is to say being such as will cause the sustentation of the can holder at such relative angle as will insure the immersion in a vertical position of the seam which is to be dipped. The top edges of the holder support lie in the same plane, and its interior is cylindric; it forming, in fact, a circular bearing within which the can holder rests and is adapted to rotate.

The can holder proper $b$, Figs. 1, 2, 3, and 4, is composed of a central, rectangular or other-shaped band $c$, supported in the center of a flat circular web $d$, around the upper circumference of which is erected a circular series of beveled teeth $e$, while downwardly depending from the under circumference thereof below the beveled teeth is a notched collar $f$ fitted to rest snugly within the support. The whole device is, in fact, a crown wheel adapted to rotate within and upon the support $a$, and which is provided with a central opening through which the can is introduced.

The fit of the can holder with respect to its support is accurate, and its beveled teeth are set to constantly engage the beveled pinion T on the pinion shaft. The internal band $c$ which bounds the opening in the holder through which the can is introduced is of sufficiently larger dimensions than the exterior dimensions of the can to permit of the easy introduction and removal of the latter and of its free although limited rotary movement when within said band. This band, in the form of apparatus represented and described, is made square, as the cross-section of such cans as are represented in the process of soldering is also a square. Where however, hexagonal or other shaped angular cans not being circular or oval, are to be soldered the outline of the band is made correspondent to the sectional outline of the can. The holder support and can holder rise and fall as described with the sliding head, and the engagement of the beveled pinion with the teeth of the holder is thus constant.

$g$, Figs. 1 and 4, is an angular bracket arm, preferably provided with a knuckle joint $h$ at its elbow, rigidly secured to the sliding head below the holder support, or to the holder support itself as represented, and provided at the lower extremity of its angularly depending arm with a revolving pad $i$ journaled therein or, if desired, other fixed stop, the office of which latter is to support the can by its lower head and prevent it from falling through the opening in the holder, and also to serve as a pivot for the rotary movement of the can.

$j$, Figs. 1, 2, 3 and 4, is a cast iron tray suitably supported in the frame work, and $k$ is a cast iron casing inclosing, for instance, benzine burners $l$, and supporting the pan $m$ for containing the molten solder. The casing rests on the cast iron tray, the tray serving to catch any benzine which may leak or overflow from the burners or supply pipes.

Within or attached to the casing $k$ is a chamber $n$ into which the gases from the burners escape and from which they are carried off through an outlet pipe $o$ to the external air.

$p$ are a series of depending cones cast on the under surface of the floor of the solder pan and serving simply to retain the heat.

The casing is provided with the usual doors, and with a spout $q$ by means of which the dross is discharged.

The pan and furnace above described are constructed in substantial accordance with Letters Patent No. 154,077, granted to me August 11, 1874,—$r$, however, are transverse ribs erected from the upper surface of the floor of the pan with the edges below the level of the solder for a purpose hereinafter explained. These ribs however constitute merely a rest for the seam of the can, and, as will be readily understood when the invention is fully comprehended, may be dispensed with, and either the floor of the pan or other equivalent projections or devices used as the rest against which the can levels itself.

$s$ is a rest branching laterally from one of the side frames, or other suitable fixed support, and terminating below the can holder, for a purpose hereinafter also to be explained.

$t$, Fig. 1, is a lug upon the rear face of the sliding head designed to encounter an adjustable stop $u$ upon the frame work, and thus cooperate with the disk cam in arresting the descent of the sliding head.

The following devices are employed for insuring the accurate retention of the can holder in the several positions into which it is rotated:—The holder support $a$ is split down one side (shown in Figs. 2, 3, 7, and 8) and the edges of the divided portion not brought closely together when the support is in a state of rest. On one side of the divided portion of the support is formed a lug $v$ and upon the corresponding side of the opposite portion is pivoted a cam lever $w$ Fig. 7. A yoke $x$ is applied to the exterior of the support and fixedly connected to that portion thereof which is provided with the lug $v$ by means of set screws $y$. The opposite extremity of the yoke embraces the cam face $w'$ of the lever $w$, so that upon the forward throw of the lever the holder support is drawn together as to its divided ends by the action of said cam face upon the embracing face of the yoke. This action is controlled to occur only during the period of rest of the can holder, with a view to clamping the holder-support tightly upon the notched collar of the can-holder so as to both retain the latter fixedly in its various positions and insure the proper engagement of the pinions with their segments.

Linked to or otherwise connected with the upwardly extending arm of the cam lever, which is pivoted at its lower end to which the cam face is applied, is a rod $z$, Fig. 2, the rear extremity of which is connected with a tappet lever $a'$ pivoted to a pin (shown in Fig. 1) depending from the boss Q or other convenient fixed support.

The front face of the disk cam is equipped with five tappet cams $b'$, Figs. 1, 2, 10, and 11, which in turn encounter a knob $c'$ on the free extremity of the tappet lever, and a knob $c''$ located on the side of said lever which faces the disk cam at a point between its fulcrum and the end which is connected with the rod $z$. Upon every revolution of the disk cam, therefore, this tappet lever is five times deflected so as to throw the cam lever $w$ forward and tighten the holder support upon the can holder, and five times deflected so as to draw it back and release its grip thereupon.

The timing of the above operation is regulated by the position of the tappet cams upon the disk cam, and is calculated to secure the tightening up of the holder support immediately after each turn of the holder therein.

Such being a description of a preferred form of apparatus conveniently embodying my invention its operation is as follows:—The machine being geared to automatically stop in the position represented in Figs. 1 and 2, in such position it is in readiness to receive a can. The solder being supposed in a molten condition in the pan, a rectangular can or one substantially of the character represented in the drawings is inserted by an attendant in the can holder and gravitates through the band thereof upon the revolving pad. Power being then applied to the driving shaft, rotation is imparted from said driving shaft, through the driving gear wheel D and the pinion I on the plunger sleeve, to the plunger sleeve, and thence through the instrumentality of the plunger and that plunger pin with which the plunger (which at the commencement of the operation is out of its socket and riding by its rod against the fixed cam way,) is in contact, to the cam disk so as to impart such sufficient rotation thereto as is determined by the period of time during which the plunger rod is riding on the fixed cam way. So soon as the plunger pin rides off its cam way the further rotation of the disk cam ceases and the plunger sleeve continues its rotation alone until the plunger rod again in such rotation encounters the fixed cam way and the plunger is projected so as to strike a succeeding plunger pin and impart a further rotation of the same character as that above described to the disk cam. This action, repeating itself again and again, insures the intermittent but determinate rotation of the disk cam. Apart from the action of the devices connected with it, the rotation of the disk cam occasions the intermittent but determinate rise and fall of the sliding head, and the timing and extent of this rise and fall is governed by the outline of the cam, which is that represented in the drawings, or a kindred outline calculated to effect the same results. The action of the disk cam proper is without effect upon the can holder except to insure its rise and fall. The rotation of the can holder is due to the segmental gears which the disk cam carries, and takes place intermittently during the period of engagement of the several segmental gears with the pinions which they respectively encounter. Assuming the can holder in the position represented in Figs. 1 and 2, the first motion imparted to the disk cam will occasion the descent of the sliding head and can holder until the can is dipped, whereupon the plunger rod will have escaped from its cam way so as to permit the disk cam to dwell for a period sufficient to insure the soaking of the side of the seam immersed. The plunger sleeve, however, continues its rotation until it again occasions the encounter of the plunger rod with the fixed cam way and forces the plunger out so as to bring to pass its encounter with that plunger pin which in such position of the parts presents itself in its path, said pin in fact being the third pin beyond that last engaged. The further rotation of the disk cam, so, as above, occasioned, will cause the lift of the sliding head and holder until they have reached the highest point of their vertical travel. In speaking of "vertical travel" it is proper for me to explain that I mean travel in a direction approximately perpendicular to the horizon, as opposed to a travel which is lateral or parallel with the horizon; and that I, here and elsewhere in this description, use the word "vertical" and in the first claim use the phrase: "in lifting said side of said seam upwardly and not laterally out of said solder bath in an angular position, &c." with a view to contradistinguishing the action of my machine from the action of the apparatus patented to Herman Miller in and by Letters Patent No. 243,287 before referred to, and in which the lift of the can from the solder bath takes place while the can is being caused to travel laterally along a track. I, of course, do not desire to restrict myself to a lift which is literally vertical or in a line perpendicular to the horizon, as it will be readily understood that if my entire apparatus was erected in a position slightly inclined from the vertical it would yet be operative in the manner described. A vertical lift however is, of course, the best and the one which in practice I resort to. I merely make this explanation, as stated, with a view to explaining the language employed in the first claim and to distinguishing between the operation of Miller's and my apparatus. Such said further continuous rotation of said disk cam will occasion the engagement of the first of its main segments W with the main pinion V (said engagement being represented in Figs. 14, 15 and 16), whereby the pinion shaft R will be rotated and the beveled pinion T caused to impart, through the medium of the beveled teeth on the can holder, a quarter rotation to the can holder. Such said further continuous rotation of said disk cam also by the curvature of the periphery thereof occasions the descent of the sliding head and can holder until the next succeeding side of the seam is dipped, at which time the plunger rod will again escape from its cam way, and the disk cam will again be allowed to dwell for a period sufficient to enable the thorough soaking of the side of the seam immersed.

The above described action is repeated with each of the two succeeding main segments so as to occasion, in all, the dipping and soaking of the four sides of one head seam of the can, namely that side which was first dipped when the can was first introduced and those three which were subsequently exposed to be dipped by the rotation of the can in the holder.

Consideration, now, of the first, second and third figures of the drawing and of the diagrams, Figs. 20 and 21, will indicate that the can holder is stopped after its quarter turns in a position slightly angular with respect to the plane of the bed of the solder pan, and not square or true therewith. This stoppage in angular position is intentionally brought about by the set of the various gears which actuate said can holder, and its object is to occasion the removal of the immersed side of the seam from the solder bath while said side is held in a slightly angular position with respect to the surface plane of the solder, for the purpose of enabling a very perfect drainage of the molten solder from the side of the seam.

Assuming the can holder set in the position represented in Figs. 1, 2 and 20, and raised for the introduction of the can,—the can inserted in it naturally assumes or coincides by correspondence of outline with the slightly angular position of said can holder, and as the latter descends enters the solder bath in said angular position, (see Fig. 5), which position it retains until the completed descent of the can holder causes the seam to rest upon the transverse ribs of the bottom of the solder pan, (Figs. 3 and 4) and the can to rotate or square itself within the holder and occupy a position with respect to said holder such as is indicated in the dotted lines in Fig. 20. The stop S is also a rest for the can. The action of the can's moving within the holder is enabled simply by reason of the fact that the holder is slightly larger than the can. The can holder, it will be understood, remains in the slightly angular position in which it is set when in its elevated position throughout its descent, throughout the dwell of the sliding head; in its ascent it commences to rotate as soon as the can clears the solder. It therefore follows that upon the ascent of said can holder the can is again caused to rotate within and assume the angular position of the holder, and therefore caused to be picked up by the holder from out of the solder bath with its seam at an angular position or in the position with respect to the plane of the surface of the solder represented in Fig. 5. This lifting of the can from the solder at an angle is important as insuring a perfect and immediate drainage from the molten solder of the side of the seam last immersed, one corner of said side being lifted from out the solder while the other remains below its level, thereby enabling the solder to drain down the seam from the corner first lifted to the corner last lifted.

The above described operation is repeated as to the three seams first dipped, and might be repeated as to the fourth; in practice, however, I prefer to stop the holder as it turns or rotates for the third time, and before its fourth descent, in an angular position opposite from that in which it has been previously stopped, in order to enable the lifting of the fourth side of the seam from out the solder bath at an opposite angle from that in which the other three sides were lifted, and to enable the consequent drainage in an opposite direction of said last side dipped. The object of such action is to drain the last side toward that corner of the seam which may be considered the next to the last, or that corner which lies between the two sides last dipped and which is subsequently itself dipped to take off whatever solder adheres to it, the said corner. This operation of dipping the corner next to the last is enabled by dropping the sliding head after giving the can holder a reverse turn to the extent of, roughly stated, an eighth rotation. The said drop and reverse turn are effected by the following means: $c^x$ $c^{xx}$ are two crests on the periphery of the disk cam approximately on radii thereof which pass through the reversing segments, and $a^x$ is a depression on said periphery intermediate between said crests and segments. After the disk cam has been rotated to an extent sufficient to have occasioned the engagement of its three main segments with the main pinion, its further rotation brings the first of the reversing segments, viz:—Z, into engagement with the idler pinion on the boss, and by such engagement occasions, through said idler, a reverse rotation in the pinion shaft to an extent regulated by the length of the reversing segment Z. This reverse turn of the pinion shaft is timed to take the place after the fourth ascent of the can holder, which ascent is completed when the crest $c^x$ of the disk cam is beneath the idler roller, so that upon that further rotation of the disk cam which brings the depression $a^x$ beneath the idler pulley, the can holder while being held in an oblique position such as that represented in the diagram of Fig. 22 makes a short descent and dips the corner of the can as above stated. The further rotation of the disk cam, by the travel of the crest $c^{xx}$ beneath the idler pulley, lifts the can holder to its former elevated position, allows drainage from the corner, and then occasions the engagement of the second reversing segment Z' with the idler pinion, and thereby imparts a further predetermined reverse rotation to the pinion shaft sufficient to effect a further eighth turn to the can holder. This second eighth turn brings the can holder back into its normal position, or that represented in Figs. 1, 2 and 20, in which position the can, dipped as to one entire head seam as above described, is ready to be removed from the holder, reversed and returned to the holder for the dipping in the same manner of the seam of its opposite head.

It will now be clearly understood that all four sides of one of the head seams of a quadrangular can are by this apparatus dipped successively; that the first three sides after having been dipped are lifted from the solder in a similar angular position so as to effect a similar drainage of each side, and that the fourth side is also lifted in an angular position but in an angular position opposite to that in which the first three sides were lifted, so as to occasion the reverse drainage of said last side; and that the can is then given an eighth turn in reversal and the corner of its seam toward which the drainage of the last side was directed (and which is intermediate between the two sides last dipped) dipped so that the last drop of solder adhering to this corner is effectually drained off.

It is proper here to state that not only does drainage commence and continuously take place while each side of the seam is being lifted in its angular position from the solder bath, but that it continues after the can has been given a quarter turn and while the side last dipped and lifted stands in a vertical position with respect to the solder bath.

This apparatus is adapted to solder but one head seam at a time, and the can, as stated, requires to be reversed before the other head seam can be soldered. If desired the holder may be conformed to receive a can in such position that a side seam instead of the head seam can be dipped.

From the above description it will also be understood that, while the lift and drop of the can holder is due solely to the disk cam proper, and the period of such lift and drop due to and determined by the arrangement of the plunger which engages with and occasions the actuation of said disk cam at stated intervals, yet the rotation proper of the can holder is due to the operation of the segmental gears which the disk cam carries, and the timing of such rotation is due to the position of said gears with respect to the crests and depressions upon the operative face of said cam.

The operation of the devices which clamp the holder support upon the can holder has been hereinbefore outlined, and I regard it sufficient here simply to say that the tappet cams are so set upon the front face of the disk cam as successively to strike the knobs on the tappet lever and to each occasion the throw of said tappet lever its connecting rod and the cam lever first in one and then in the other direction, and to thereby occasion the alternate tightening up and loosening of the holder support with respect to the can holder. The set of the tappet cams upon the disk cam is such as to occasion the clamping of the can holder by the holder support only during the various periods of non-rotation of said holder, and to occasion the loosening of said support just prior to and during each period of rotation of said holder.

In Figs. 23, 24 and 25 I have represented a modified form of construction in which the disk cam (Fig. 24) is made as a single device which is applied to the cam shaft in advance of the front cross ties, so as to bring it in line below the front portion of the pinion shaft, close to the rear face of the sliding head, and nearer the point at which the greatest weight is concentrated. In this arrangement I of course apply the friction roller U to the front of the pinion shaft, excavate the boss to admit the periphery of the disk cam, reconstruct the holder support as to the parts by which it is connected to the sliding head, and slightly change the form of the bracket arm which supports the revolving pad $i$. I then apply to the cam shaft some distance to the rear of the disk cam a spider $b^\times$ which is equipped with both the main and the reversing segments, the plunger pins and tappet cams, in the other construction carried by the disk cam itself. This arrangement is so clearly illustrated in Figs. 23, 24 and 25 that further description of it is unnecessary; its operation is precisely the same as that of the machine first described, the set of the disk cam with respect to the spider being such as to occasion the operation of the segmental gears and tappet cams at proper intervals considered with respect to the crests and depressions on the disk cam.

I have now described both the construction and operation of a machine which I believe to embody my invention in the most advantageous manner. I desire however to add that I do not wish to restrict myself to the precise form and relative arrangement of the component parts described, as a skillful mechanic could without doubt make many changes in detail of both construction and arrangement without departing from the invention properly as such. I myself, for instance, contemplate the employment of a disk cam of such size and outline as to enable the proper stoppage of the sliding head and can holder in their various respective positions without stopping the rotation of the cam, thereby dispensing with the plunger sleeve, plunger and plunger operating devices and enabling the application of power directly to the disk cam. It is also possible either to dispense with the devices for clamping the holder support upon the can holder and rely upon the accurate fit of the can holder within its support to retain said holder in its given fixed positions, or else to arrange the holder support so as to have a constant frictional tension upon the can holder and provide sufficient driving power to overcome the increased resistance. I have also described with some exactness a specific method of introducing the sides of the seams into the bath and of withdrawing them therefrom, and have specified certain angular positions in which I cause the can to be withdrawn from the bath, in which connection I desire now to state that it will be perfectly possible to effect the accurate soldering of a can when the holder is set square with the solder pan and not slightly oblique, and when the can is simply given four quarter turns and dipped with its seam parallel with the plane of the surface of the solder, and that moreover the dipping of a corner is not essential to such action. That, in addition, instead of dipping that corner which is intermediate between the two sides last dipped, I could set the machine without reversing to dip the corner last reached or that corner which is next beyond that corner which I have described as being dipped; but all these possibilities of operation are not such as tend to the most desirable method, as the best results are attained and the minimum of solder consumed by withdrawing the several sides of the seam in precisely the manner hereinbefore described, and in then reversing an eighth turn and dipping the corner next to that last reached Again it is perfectly possible to leave the holder in its state of final rest in the oblique position represented in Fig. 22, so that its first descent would dip a corner of the can, but I prefer that it should be stopped so that a side of the seam rather than a corner should be first dipped.

I have by many experiments discovered that that method of dipping which enables perfect sealing with the minimum of solder, is best performed by retaining a given side of the seam in the solder until the tin about it is thoroughly heated; by then taking that side out of the solder at an angle, one of its ends rising before the other; by then turning the can and dipping the succeeding side into the solder in the quickest possible time, so that the side previously dipped will be still hot enough to continue to drain after its removal from the bath by proceeding in this manner until the four sides have each been dipped, taking care meanwhile to raise the fourth side from the bath at an angle opposite to that at which the others have been raised; and by, finally, reversing the can so as to present that corner which is intermediate between the two sides last dipped and dipping that corner. The application of the above method effects the most perfect drainage that can, to my knowledge, be accomplished.

Having thus described my invention, I claim and desire to secure by Letters Patent of the United States:—

1. The process of soldering the head seams of a quadrangular, square, or angular can, which consists, first, in dipping downwardly and not laterally a given side of one of the head seams in a given bath of molten solder, second, in lifting said side of said seam upwardly and not laterally out of said solder bath in an angular position with respect to the plane of the surface of the molten solder, and, third, in repeating said above named dipping and lifting operation with each side of said seam in successive order, substantially as hereinbefore set forth.

2. The process of soldering the head seams of a quadrangular, square, or angular can, which consists, first, in dipping each side of one of the head seams in successive order in a bath of molten solder, and, second, in dipping a corner of said seam in said bath.

3. The process of soldering the head seams of a quadrangular, square, or angular can, which consists, first, in dipping each side of one of the head seams in successive order in a bath of molten solder, second, in lifting each side of said seam in successive order out of said solder bath in an angular position with respect to the plane of the surface of the molten solder, and, third, in dipping a corner intermediate between two of the sides so dipped into said solder bath.

4. The process of soldering the head seams of a quadrangular, square, or angular can, which consists, first, in dipping each side of one of the head seams in successive order in a bath of molten solder, second, in lifting each of the first three sides of said seam in successive order and in a corresponding angular position with respect to the plane of the surface of the molten solder out of said solder bath, third, in lifting the fourth side of said seam out of said solder bath in an angular position with respect to the plane of its surface opposite to that in which the first three sides were lifted, and, fourth, in dipping a corner intermediate between two of the sides so dipped into said solder bath.

5. In a machine for soldering the seams which secure the heads to the bodies of quadrangular, square, hexagonal, or other sheet metal cans not circular or oval, the following instrumentalities in combination:—first, a revoluble can holder the can-receptive opening in which is conformed to the outline of the can contained by it and is internally sufficiently larger than said can to permit of a slight rotation of the can within it; second, a pan or suitable device adapted to contain solder; third, a rest within said pan against which upon the descent of the can holder one of the sides of the head seam of the can settles so as to occasion a slight rotation of said can within the holder; fourth, a sliding head with which said can holder is connected so as to rise and fall therewith; fifth, mechanism whereby the sliding head is at predetermined intervals caused to ascend and to descend; and, sixth, mechanism whereby the can holder is at predetermined intervals caused to rotate; all substantially as hereinbefore set forth.

6. In a machine for soldering the seams which secure the heads to the bodies of quadrangular, square, hexagonal, or other sheet metal cans not circular or oval, the following instrumentalities in combination:—first, a revoluble can holder the can-receptive opening in which is conformed to the outline of the can contained by it and is internally sufficiently larger than said can to permit of a slight rotation of the can within it; second, a pan or suitable device adapted to contain solder; third, a rest within said pan against which upon the descent of the can holder one of the sides of the head seam of the can settles so as to occasion a slight rotation of said can within the holder; fourth, a sliding head with which said can holder is connected so as to rise and fall therewith; fifth, mechanism whereby the sliding head is at predetermined intervals caused to ascend, and caused to descend and stop or pause before again ascending; and, sixth, mechanism whereby the can holder is at predetermined intervals and while it is above its lowest position caused to turn or rotate a predetermined distance; all substantially as hereinbefore set forth.

7. In a machine for soldering the seams which secure the heads to the bodies of quadrangular, square, hexagonal or other sheet metal cans not circular or oval, the following instrumentalities in combination: first, a revoluble can holder adapted to receive a can; second, a sliding head to which said can holder is connected so as to rise and fall therewith; third, mechanism whereby the sliding head is at predetermined intervals caused to ascend, and caused to descend and stop or pause before again ascending; fourth, mechanism whereby the can holder is caused subsequent to its first descent to make three successive quarter turns in one direction and a turn less than a quarter (approximately an eighth) in the opposite direction, said turns taking place respectively prior to the respective subsequent descents; and, fifth, a pan or suitable device adapted to contain solder.

8. In a machine for soldering the seams which secure the heads to the bodies of quadrangular, square, hexagonal, or other sheet metal cans not circular or oval, the following instrumentalities in combination: first, a revoluble can holder the can receptive opening in which is conformed to the outline of the can contained by it and is internally sufficiently larger than said can to permit of a slight rotation of the can within it; second, a pan or suitable device adapted to contain solder; third, a rest within said pan against which upon the descent of the can holder one of the sides of the head seam of the can settles so as to occasion a slight rotation of said can within the holder; fourth, a sliding head with which said can holder is connected so as to rise and fall therewith; fifth, mechanism whereby the sliding head is at predetermined intervals caused to ascend and to descend; sixth, mechanism whereby the can holder is at predetermined intervals caused to turn or rotate; and, seventh, mechanism whereby the can holder upon the completion of each turn and prior to the next is fixedly held in the respective positions into which it has been turned, all substantially as hereinbefore set forth.

9. In a machine for soldering the seams which secure the heads to the bodies of quadrangular, square, hexagonal, or other sheet metal cans not circular or oval, the following instrumentalities in combination: first a pan or suitable receptacle or device adapted to contain molten solder; second, a revoluble can holder adapted to receive the can; third, a sliding head to which said can holder is connected so that it rises and falls therewith; fourth, mechanism whereby the sliding head is at predetermined intervals caused to ascend and to descend; fifth, mechanism whereby the can holder is, first, at predetermined intervals caused to turn, and, second, after given turns caused to stop in a slightly angular position with respect to the plane of the surface of the molten solder, so as to enable the withdrawal of each side of the seam from the solder bath at an angle, substantially as set forth.

10. In a machine for soldering the seams which secure the heads to the bodies of quadrangular, square, hexagonal or other shaped sheet metal cans not circular or oval, the following instrumentalities in combination: first, a pan or suitable receptacle or device adapted to contain molten solder; second—a revoluble can-holder adapted to receive a can, third, a sliding head to which said can holder is connected so that it rises and falls therewith; fourth, mechanism whereby the sliding head is at predetermined intervals caused to ascend and to descend; fifth, mechanism whereby the can holder is, first, at predetermined intervals caused to turn three times in the same direction, second, for its first two above turns caused to stop at similar angles with respect to the plane of the solder bath, third, for its third above turn caused to stop at an angle opposite or oppositely inclined to the angles first named, fourth, to reverse or rotate in the opposite direction an eighth turn and stop in such position, and, fifth, to reverse a further eighth turn in the same direction and stop at an angle correspondent with the angles at which it was stopped after its first two turns, so as to enable the withdrawal of three sides of the can head seam at a corresponding angle from out said solder bath, and the withdrawal of one of the four sides at an opposite angle from out said bath, and to further enable the dipping of a corner intermediate between the two sides last dipped.

11. In a machine of the class above recited, in combination the can holder, the holder support, the sliding head, the pinion shaft provided with the main pinion the reversing pinion and the idler roller, the idler pinion, the disk cam, and the segmental gears, substantially as set forth.

12. In a machine of the class above recited, as a device for occasioning the intermittent quarter turns of the can holder, the main segmental gears of the disk cam, in combination with the main pinion, pinion shaft, beveled pinion, and can holder having the bevel gear, substantially as set forth.

13. In a machine of the class above recited, as a device for occasioning two one-eighth reverse turns or rotations of the can holder, the reversing segments of the disk cam, in combination with the idler pinion, reversing pinion, pinion shaft, beveled pinion, and can holder having the bevel gear, substantially as set forth.

14. In a machine of the class above recited, as a device for tightening up the holder support upon the can holder, the cam lever, in combination with the connecting rod, tappet lever, tappet cams, and disk cam, substantially as set forth.

15. In a machine of the class above recited, the combination of a revoluble can holder the can-receptive opening in which is conformed to the outline of the can contained by it and is internally sufficiently larger than said can to permit of a slight rotation of the can within it,—means for both raising and lowering and for revolving the can holder,—a pan or suitable device adapted to contain solder and located below the can holder,—and a rest within said pan against or upon which upon the descent of the can holder one of the sides of the head seam of the can settles so as to occasion a slight rotation of said can within the holder, substantially as and for the purposes specified.

16. In a machine of the class above recited, as a means for effecting both the lift and fall of the sliding head and the intermittent rotation of the can holder, the following devices in combination:—the disk cam, the main segments, the reversing segments, the pinion shaft, and the contrivances applied to said shaft for transmitting the throw of the segments and of the disk cam to the can holder, substantially as described.

17. In a machine of the class above recited, in combination with a pan or suitable receptacle for containing solder, ribs or projections within or connected with said pan and adapted to receive one of the head seams of the can upon the descent of the holder with the can and to square said can with respect to said pan,—and a revoluble can holder the can-receptive opening in which is conformed to the outline of the can contained by it and is internally sufficiently larger than said can to permit of a slight rotation thereof within it, substantially as described.

18. In combination with a revoluble can holder the can receptive opening in which is conformed to the outline of the can contained by it and is internally sufficiently larger than said can to permit of a slight rotation of the can within it,—a stop below said can holder and fixedly related thereto which both arrests the passage of the can completely through the opening in the holder and serves as a pivot to aid in the rotation of the can within its holder, substantially as set forth.

In testimony whereof I have hereunto set my hand this 20th day of January—1883.

GEORGE H. PERKINS.

In presence of—
J. BONSALL TAYLOR,
WALTER S. GIBSON.